Patented Dec. 9, 1952

2,621,195

UNITED STATES PATENT OFFICE 2,621,195

POLYMERIC TITANIUM COMPOUNDS

John H. Haslam, Arden, Del., assignor to E. I. du Pont de Nemours and Company, Wilmington, Del., a corporation of Delaware No Drawing. Application October 26, 1950, Serial No. 192,365

8 Claims. (Cl. 260—414)

This invention relates to polymeric titanium carboxylates or polytitanyl carboxylates and to novel methods for preparing such compounds. More particularly, it relates to a method for preparing organo-soluble polymeric titanium compounds useful as surface-active agents and through the reaction of organic esters of orthotitanic acid with organic or carboxylic acids and with water.

Experimentation in the field of titanium organics is relatively new. The chemistry of titanium is still not clearly understood and new titanium compounds having new and valuable uses as well as new processes for producing such compounds are constantly being discovered. At the same time, general researches in organic chemistry have developed many novel industrial applications for innumerable complex compounds, have succeeded in synthetically making materials which have hitherto been important but difficultly obtainable naturally, and have opened vital new fields for commercial exploitation. A class of substances of particular industrial interest at present comprises various organic esters of inorganic acids. Certain of these esters will react with organic acids to yield desirable new products. It is to this phase of experimentation, and especially in its application to organic titanium compounds, that the present invention is particularly directed.

Accordingly, it is among the objects of this invention to provide new polymeric titanium carboxylates or polytitanyl carboxylates and novel methods for effecting their preparation. Another object is to provide a readily adaptable and commercially utilizable method for preparing new high-molecular-weight polymeric esters and ester carboxylates of polytitanic acid possessing unique solubility characteristics in organic, especially hydrocarbon, solvents. A further object is to provide solutions containing said polymeric titanium carboxylates exhibiting novel surface-active effects, whereby such solutions become adaptable for use in a wide variety of commercial applications. Further objects and advantages of the invention will be apparent from the ensuing description thereof.

It has been discovered that organic, and especially ortho, esters of titanium can be reacted with certain organic or carboxylic acids and with regulated or controlled amounts of water to provide products which comprise polymeric titanium carboxylates or polytitanyl carboxylates which are generally valuable as surface-active agents and adaptable for use in numerous other fields.

Thus, in accordance with this invention, an ortho-titanate having the formula $Ti(OR)_4$, wherein R is an organic radical such as an alkyl, cycloalkyl, aryl, alkaryl or aralkyl group, is reacted with a carboxylic acid and with a regulated amount of water, the reaction being allowed to continue until the desired polytitanyl carboxylate is formed.

In a more specific and preferred embodiment, the invention comprises reacting through moderate heating an alkyl orthotitanate such as tetraisopropyl titanate with at least one mole but less than 2 moles of water per mole of the ester, with a carboxylic acid containing at least 4 carbon atoms in its structure, and recovering a stable, soluble polymeric titanium carboxylate.

In one practical application of the invention employing, for example, tetraisopropyl titanate as the ester, an equimolar quantity of water is first added to the ester and the mixture is then commingled with such an amount of monocarboxylic acid, such as stearic acid, as will provide not to exceed about 2 moles of acid per mole of ester. The reactants are then heated at temperatures of about 50° C., the by-product alcohol being removed from the resulting product by resort to distillation under reduced pressure, and the polytitanyl carboxylate isolated from excess stearic acid by solvent extraction.

Polytitanyl carboxylate products of this invention comprise colorless to brown liquids and solids. They are readily and uniquely soluble in organic solvents, such as chloroform, benzene, toluene, xylene, etc., the resulting solutions exhibiting novel surface-active properties.

To a clearer understanding of the invention, the following specific examples are given. These are merely in illustration, but not in limitation of the invention:

*Example 1*

Stearic acid in the amount of 11.3 pounds was mixed with 5.6 pounds of tetraisopropyl titanate, and the mixture was heated at up to 50° C. for two hours to melt the acid and dissolve it in the liquid ester. A moderately viscous, light brown liquid resulted. This was cooled to room temperature, after which 0.35 pound of water was added dropwise with agitation. The resulting liquid, which had not materially changed in appearance, was then heated at 50° C. under reduced pressure to strip off the isopropanol by-product. The residue was allowed to cool and stand overnight; a light brown, waxy solid resulted. This was extracted with acetonitrile to remove unreacted stearic acid. On analysis, the final product was found to comprise about 1.5 moles of stearic acid per mole of titanium, i. e., polytitanyl sesquistearate.

*Example II*

Four hundred twenty-three parts by weight of oleic acid (95% pure) and 426 parts of tetra-isopropyl titanate were intimately mixed. These proportions were calculated to provide one carboxyl group for each titanium, the carboxyl value being based on the acid number determined by experimentation. Where an impure acid or a mixture of acids is employed, this procedure is generally more accurate than simple reliance upon molar proportions. The mixture of acid and ester grew warm, indicating that reaction was occurring. After the mass had again cooled, it was diluted with an equal volume of petroleum ether to reduce its viscosity so that it might be more easily handled in subsequent operations. An equal volume of water (i. e., a large stoichiometric excess) was poured into the mass and thoroughly mixed therewith. The mixture was then allowed to stand until an ether layer and an aqueous layer separated out; the ether layer was finally recovered and the ether removed therefrom by distillation. The product was found to correspond to polytitanyl mono-oleate.

*Example III*

A polytitanyl monolaurate was prepared by dissolving eighteen pounds of water in sufficient dioxane to make a total of 150 quarts of solution. This dilute solution was slowly added in a thin stream to 564 pounds of tetra (2-ethyl-hexyl) titanate; the product was a homogeneous colorless liquid. This product was distilled at 100° C. to remove the dioxane and by-product 2-ethyl hexanol; the pressure was at atmospheric until most of the dioxane had volatilized, but after that the pressure was reduced in order to remove the alcohol at a temperature of 100° C. The residual mass after cooling was a light yellow, viscous liquid. Lauric acid in equimolar proportions with the titanium ester, or 200 pounds, was then added with agitation and the temperature raised to 50° C. After rapid reaction the pressure was reduced and the by-product 2-ethyl-hexanol removed by distillation. The product was extracted with acetonitrile to remove unreacted lauric acid.

Part of this purified product was analyzed and found to comprise a polymer having the unit structure

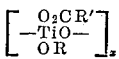

R being the 2-ethyl-hexyl group and R'CO₂ being the lauric acid group.

A portion of the above product was dissolved in an equal volume of cyclohexane and agitated thoroughly with water. This material was then allowed to separate into an oil and a water layer, and the oil layer was removed and stripped of solvents at 150° C. under reduced pressure. This hydrolysis produced a polymer having the unit structure

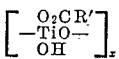

it is probable that crosslinking occurred through the (OH) groups.

*Example IV*

A complex product of mixed polytitanyl carboxylates was prepared from mixed soybean acids, the major constituents of such acids being oleic and linoleic acids, with minor proportions of palmitic and stearic groups. The acid number of the particular mixture used was 198.7. Four hundred and sixty-six parts by weight of this mixture were combined slowly with 474 parts of tetraisopropyl titanate, with agitation. The mass grew warm, indicating that a reaction was occurring, and it was then diluted with petroleum ether and cooled. Water in the amount of 59.5 parts by weight was added thereto in a thin stream with agitation, and the liquid mix grew milky. The petroleum ether was then removed by stripping at 80° C., leaving a light brown, homogeneous reaction mass. This was filtered while still hot, to remove other impurities found in the soybean material, and the filtrate was again treated at 110° C. under low vacuum to remove remaining solvents and impurities. A light brown, waxy solid was obtained.

*Example V*

A polymeric titanium monostearate was prepared by commingling equimolar ratios of stearic acid and tetrabutyl titanate. This mixture was heated slightly to melt and dissolve the acid in the titanate. When the mass was sufficiently homogeneous, it was cooled, and one mol of water was added with accompanying agitation. After by-product butanol and unreacted stearic acid had been removed by procedures similar to those referred to in the preceding examples, a waxy light brown solid product was obtained.

While the invention has been described in its application to certain specific embodiments thereof, it is not to be construed as restricted thereto. Thus, in lieu of the tetra orthotitantes mentioned, other organic titanates corresponding to the general formula Ti(OR)₄, and especially those in which R is an alkyl hydrocarbon radical of an alcohol containing from 1–12 carbon atoms, can be used. Although I usually employ an orthotitanic ester of the general type of Ti(OR)₄ this invention also includes the use of condensed esters of the class

Such a condensed ester would be reacted with not more than two carboxyl groups per titanium atom, while the remaining OR groups would be reacted with water. It is believed that such condensed esters are formed in the practice of this invention when the water is first added to the orthotitanic ester. The alcohols may be aliphatic or aromatic, substituted or unsubstituted, in character. As examples of useful types, the titanium ortho esters of ethyl alcohol, butyl alcohol, isopropyl alcohol, amyl alcohol, 2-ethyl hexanol, or mixtures thereof, can be used. Thus, specific examples of useful organic titanates include those of ethyl orthotitanate, methyl orthotitanate, isopropyl orthotitanate, amyl orthotitanate, octyl orthotitanate, dodecyl orthotitanate, as well as 2-ethylhexyl, benzyl, cyclohexyl, phenyl, ethoxyethyl and betanaphthyl orthotitanates, etc. If necessary, and in order to facilitate the reaction, as where the ester comprises a solid or a highly viscous liquid, an inert organic solvent, can be employed.

In carrying out the invention, the desired quantity of water can be first added to the ester and the products subsequently commingled with the particular acid reactant employed. Alternatively, the acid and the ester can be first mixed and then added to the water. Products of reaction comprise a polytitanyl carboxylate and a by-product alcohol, the latter being derived from the original titanium ester. Generally, removal of the alcohol is preferably effected by washing with water if it is water-soluble, by vacuum distillation, and/or by gentle heating, said alcohol being then available for various uses, such as preparation of additional titanium esters. However, it is not necessary always to remove the alcohol since in some instances the unpurified carboxylate product is perfectly satisfactory for use.

Monocarboxylic acids having eight or more carbon atoms are preferred. They may be of straight or branched chain structure, saturated or unsaturated, substituted or unsubstituted. Although the above acids are preferred, I may also use acids of as little as four carbon atoms. Products prepared with eight or more carbon atom acids are more water-stable and often more organic soluble than those prepared with the lower molecular weight acids. Examples of such monocarboxylic acids include, stearic, palmitic, ricinoleic, linoleic, lauric, myristic, oleic, butyric, benzoic, isobutyric, caproic, heptylic, caprylic, nonylic, capric, valeric, linseed oil acids, castor oil acids, tall oil, cocoanut oil acids, rosin, soybean acids, tung acids, other natural or artificially mixed acids, and similar compounds.

Polycarboxylic acids of various structures may also be used, particularly dicarboxylic acids of from two to twelve carbon atoms separating the carboxyl groups. These acids may also be saturated, unsaturated, straight chain, branched chain, substituted or unsubstituted. The preferred use of polycarboxylic acids is in admixture with the monocarboxylic acids since the sole use of a polycarboxylic acid may result in excessive crosslinking with the consequence that the product as a rule is too insoluble to be of practical use. A more advantageous use of the polycarboxylic acids, especially the dibasic acids, lies in admixing them with the monocarboxylic acids in varying proportions thereby obtaining a controllable increase in molecular weight and water stability. A few of the polycarboxylic acids which I may use, preferably to modify the monocarboxylic acid products are succinic, maleic, glutaric, adipic, azelaic, sebacic, mesaconic, methyl succinic, phthalic, etc. If high in molecular weight and therefore solid or too viscous for intimate mixing in the reaction, the acid reactant can be dissolved, prior to use, as in the instance of the ester, in an inert solvent therefor. Hence, it is contemplated as within the scope of the invention to conduct the reaction in the presence or absence of such organic solvents. The concentration of the solution employed is determined usually by the limits of the solubility of the reactants and for practical purposes solutions of as high a concentration as possible are employed.

The polymeric titanium carboxylates of this invention, and particularly resulting from the reaction of the longer chain (8 to 20 carbons) acids which are organo-soluble oils or low melting, wax-like substances, exhibit unique solubility properties in petroleum and other hydrocarbon solvents. As already indicated, the resulting hydrocarbon solutions possess novel surface-active properties to render such solutions particularly valuable commercially as surface-active agents. Thus, they make excellent detergents, additives for lubricating oils and greases, additives for grinding in organic systems, for paints, for dry cleaning materials, and the like. The present invention possesses many advantages by reason of its ease of operation and decreased cost. Substantially no loss is experienced in the expensive reactants employed, since essentially all of the acid is utilized in the product. This high utilization is due to the fact that any unused acid may be extracted, for example with acetonitrile, and easily recycled to the process. The only by-product comprises an alcohol which is generally either readily salable as such or easily utilized in the preparation of additional titanium esters in the invention.

The relative proportions of the various reactants will depend upon the particular polymeric carboxylate being prepared. At least one mole of water per mole of ester must be employed in the invention when high molecular weight products are desired since each mole of water frees 2 alkoxy groups from their combination in the titanium ester.

The careful control of the amount of water used in this reaction is of importance when the water is added to the titanium ester prior to the addition of the acid and even when the three reactants are mixed simultaneously. This is apparently because of the relatively fast reaction between the ester and water leading to a condensed ester. One mol of water added to one mol of a titanium orthoester causes immediate reactions illustrated by the following equations.

(1) $2Ti(OR)_4 + 2HOH \rightarrow 2Ti(OR)_3OH + 2ROH$ (2) $2Ti(OR)_3OH \rightarrow (OR)_3Ti-O-Ti(OR)_3 + HOH$ (3) $(RO)_3Ti-O-Ti(OR)_3 + HOH \rightarrow$
$(RO)_3Ti-O-Ti(OR)_2OH + ROH$ Two molecules of the dimeric hydroxy titanium ester may then condense to a tetramer liberating one mol of water which continues to react similarly. Thus it may be seen that the ultimate effect of equimolar quantities of water and orthoester will be the removal of substantially two OR groups from each titanium atom and the formation of a condensed polyester of high molecular weight. In practice it has been found that the addition of an excess of water over the equimolar quantity results in the formation of some insoluble and unreactive product. I therefore prefer to add no more than one mol of water for each mol of ortho-ester in cases where the water is added prior to or with the acid constituent. However, when the carboxylic acid portion is added to the ester and the reaction between the two has occurred with the elimination of the alcohol, I may then add large amounts of water because at this stage the complete hydrolysis of the remaining OR groups is usually desired. It is generally true then that, in the practice of this invention, large amounts of water may be added but only after the desired amount of the carboxylic acid has reacted with the titanium compound. As previously indicated the large excess of water is useful in washing the product free of the by-product alcohol when said alcohol is water soluble. The herein specified "controlled amount" of water is that which is required to react chemically with those OR groups of the titanium ester which are not destined to be replaced by the carboxylic acids. This water acts to bring about the polymerization whether it is added before or after the addition of the carboxylic acid reactants.

To obtain products of relatively high molecular weight it is best to react not more than two mols of a mono-carboxylic acid with each mol of titanium ester. The reacting of greater equivalents of carboxy compounds tends to decrease the degree of polymerization obtainable. The actual amount of acid reacting with the ester can be controlled by adding about the correct amount and allowing the reaction to go to completion or by adding an excess and, by proper time and temperature control, reacting the desired amount and recovering the rest. The reaction between ester and acid can, of course be rapidly stopped by addition of excess water. To obtain good solubility in organic solvents and a resinous product of workable properties it has been found expedient to react from about one to one and one-half equivalents of the carboxylic acid with each titanium atom.

The action of water when added after the reaction between the ester and the acid is illustrated to some extent by Equations 4, 5, 6, 7, and 8 wherein R is an organic radical such as an alkyl, cycloalkyl, aryl, alkaryl, aralkyl group and R' is an organic radical containing from 4-20 carbon atoms:

(4) $(RO)_4Ti + 2R'CO_2H =$
$(R'CO_2)_2Ti(OR)_2 + 2ROH$

The titanium compound of Equation 1 will, in the presence of one mole of water, further react thus:

(5) $X(R'CO_2)_2Ti(OR)_2 + XH_2O =$
$[(R'CO_2)_2TiO-]_x + 2XROH$

The above equations are merely illustrative of reactions in which one mole of ester is reacted with two moles of acid. When ester: acid ratios of 1:1 or 1:1.5 and the like are resorted to, the following reactions occur:

(6) $(RO)_4Ti + R'COH_2H = R'CO_2Ti(OR)_3 + ROH$

The addition of one mole of H₂O to the $R'CO_2Ti(OR)_3$ from Equation 3 results in the following equation:

(7)

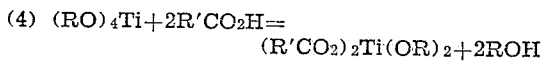

(8) $2(RO)_4Ti + 3R'CO_2H = (R'CO_2)_2Ti(OR)_2 +$
$(R'CO_2)Ti(OR)_3 + 3ROH$

The addition of two mols of water to a mixture of one mol each of the above titanium compounds may result in polymers of the following type:

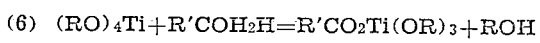

All of these equations indicate that the same number of moles of acid will appear in the product as were originally reacted with the ester, and that one mol of H₂O removes two alkoxy (OR) units from the titanium compound.

As already mentioned, it is relatively unimportant whether the water or the acid be first incorporated with the ester; but where the ester and water are first mixed, danger of hydrolysis should be avoided by limiting the amount of water to that stoichiometrically required for reaction with not more than two of the (OR) groups and avoiding any excess. In other respects, the reactions illustrated by the above equations occur satisfactorily by either method of mixing. The presence or absence of water is material, however, in relation to the possible application of heat during the process. Heat is in fact not essential at all, since the reaction generally proceeds adequately at room temperature; but it is sometimes preferable in order to facilitate removal of the alcohol by-product. Where it is desired to employ an elevated temperature, this should generally be done only after the water has been added to the reaction mass. Referring, for example, to the Equations 4 and 6, if heat of greater than about 50° C. is applied to the titanium compound $(R'CO_2)_2Ti(OR)_2$, in the absence of water, a titanium product such as

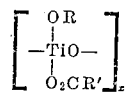

and a by-product $R'CO_2R$ will result. Such by-product is generally quite difficult to remove from the titanium compound, solvent-extraction or vacuum-distillation techniques being required; even when removed, it cannot be recycled directly in the present process. Too, it may not often be simply left in the titanium product, as an alcohol by-product may, because in some cases it is a much more deleterious contaminant. It should be noticed, also, that the failure to use water, as here illustrated, results in the loss of half of the relatively costly acid reactant; for an original addition of two moles of acid, a product containing only one mole results.

I claim as my invention:

1. A process for the preparation of a stable, soluble polymeric titanium carboxylate which comprises reacting an organic ester of titanic acid having the formula Ti(OR)₄ wherein R is an organic radical selected from the group alkyl, cycloalkyl, aryl, alkaryl, and aralkyl with a carboxylic acid containing from 4-20 carbon atoms and with at least one mole but less than two moles of water per mole of ester employed in the reaction.

2. A process for the preparation of a stable, soluble polymeric titanium carboxylate which comprises reacting an organic ester of orthotitanic acid having the formula Ti(OR)₄ wherein R is an organic radical selected from the group alkyl, cycloalkyl, aryl, alkaryl, and aralkyl with a monocarboxylic acid containing from 8-20 carbon atoms in its structure and with at least one mole but less than two moles of water per mole of ester employed in the reaction.

3. A process for the preparation of a stable, soluble polytitanyl carboxylate which comprises reacting a mixture of one mole of an organic ester of orthotitanic acid having the formula Ti(OR)₄ in which R is an alkyl hydrocarbon radical of an alcohol containing from 1-12 carbon atoms, not more than 2 moles of a monocarboxylic acid containing from 4-20 carbon atoms, and at least one mole but less than two moles of water per mole of ester used, and thereafter recovering the resulting polymeric titanium carboxylate.

4. A process for preparing a stable, soluble polymeric titanium carboxylate comprising reacting a titanic ester having the formula Ti(OR)₄ wherein R is an alkyl hydrocarbon radical containing from 1-12 carbon atoms with from one mole to less than two moles of water per mole of said ester, reacting the resulting product with a carboxylic acid containing from 8-20 carbon atoms, and thereafter recovering the carboxylate compound.

5. A process for the preparation of a stable, soluble polymeric titanium carboxylate compound which comprises commingling an organic ester of orthotitanic acid having the formula Ti(OR)₄ wherein R is an alkyl hydrocarbon radical containing from 1-12 carbon atoms and an equimolar quantity of water, and reacting the resulting product with a monocarboxylic acid containing from 8-20 carbon atoms.

6. A process for the preparation of stable, soluble polymeric titanium stearate which comprises reacting an alkylorthotitanate with stearic acid and with an equimolar quantity of water, and thereafter recovering the resulting polymeric titanium stearate.

7. A process for the preparation of stable, soluble polymeric titanium oleate which comprises reacting an alkylorthotitanate with oleic acid and with an equimolar quantity of water, and thereafter recovering the resulting polymeric titanium oleate.

8. A process for the preparation of stable, soluble polymeric titanium laurate which comprises reacting an alkylorthotitanate with lauric acid and with an equimolar quantity of water, and thereafter recovering the resulting polymeric titanium laurate.

JOHN H. HASLAM.

REFERENCES CITED

The following references are of record in the file of this patent:

UNITED STATES PATENTS

| Number | Name | Date |
|---|---|---|
| 2,058,844 | Vaughn | Oct. 27, 1936 |
| 2,453,520 | Langkammerer | Nov. 9, 1948 |
| 2,489,651 | Langkammerer | Nov. 29, 1949 |
| 2,490,691 | Langkammerer | Dec. 6, 1949 |

FOREIGN PATENTS

| Number | Country | Date |
|---|---|---|
| 125,450 | Australia | Sept. 25, 1947 |